United States Patent Office 2,973,341
Patented Feb. 28, 1961

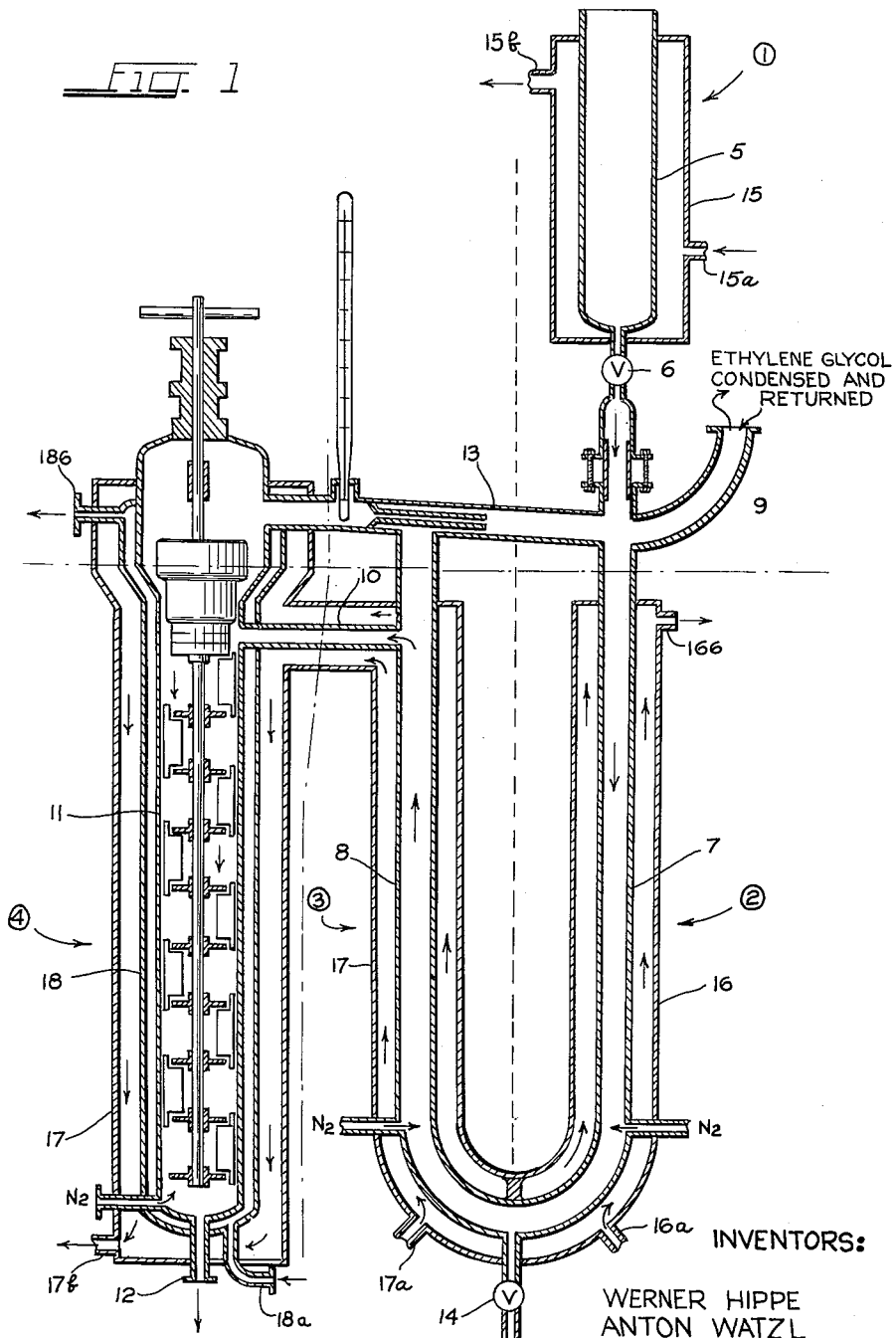

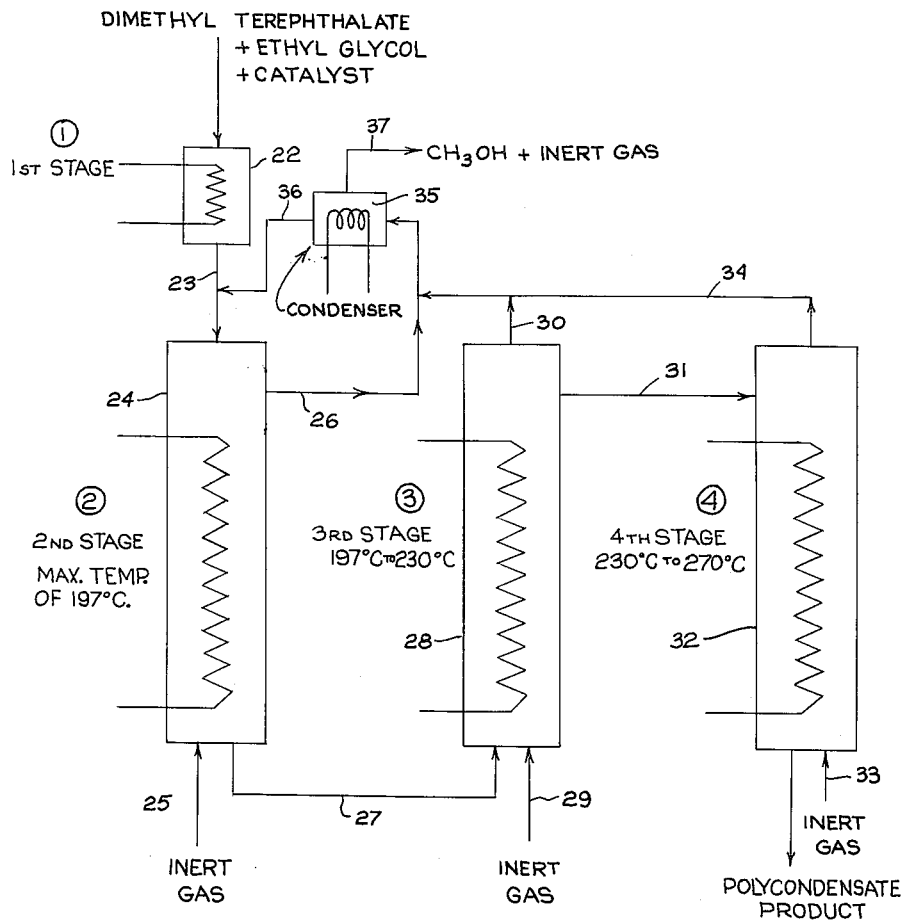

2,973,341

CONTINUOUS PROCESS FOR PRODUCTION OF A POLYETHYLENE TEREPHTHALATE CONDENSATE

Werner Hippe, Erlenbach (Main), Anton Watzl, Kleinwallstadt (Main), and Walter Hagen, Aschaffenburg, Germany, assignors to Vereinigte Glanzstoff-Fabriken A.G., Wuppertal-Elberfeld, Germany Filed Jan. 28, 1957, Ser. No. 636,762

6 Claims. (Cl. 260—75)

This invention relates to a continuous process for production of a polyester condensate, and more particularly to an improved and continuous process for production of polyethylene terephthalate from dimethyl terephthalate and ethylene glycol.

In order to obtain linear aromatic polyesters from terephthalic acid or its lower molecular weight esters and glycols, it has been the usual practice to carry out a discontinuous condensation reaction at relatively high temperatures and in vacuo for a sufficient period of time to produce a polyester condensate which is capable of being extruded and drawn into filaments or fibers. In the production of polyethylene terephthalate, also referred to as polyethylene glycol terephthalate, from dimethyl terephthalate and ethylene glycol, essentially two condensation reactions occur. First, the dimethyl terephthalate is subjected to transesterification, i.e., an ester interchange, with an excess of ethylene glycol to produce the ethylene glycol ester of terephthalic acid while removing methanol as a vaporous reaction product. The ethylene glycol ester is then polycondensed under further heating until the desired degree of polymerization is obtained, ethylene glycol being split off during this polycondensation.

The relatively high temperatures which are required for this discontinuous reaction together with the extended period of time required to reach a satisfactory degree of polymerization have been found to result in an unavoidable degradation or decomposition of the polycondensate product. An unfavorable quality is imparted to the product since the polycondensate tends to discolor and turn yellow.

One object of the invention is to provide a continuous process for the production of a polyester condensate from dimethyl terephthalate and ethylene glycol.

Another object of the invention is to provide a continuous process in which the time required for the condensation reaction can be considerably reduced, thereby substantially avoiding any danger of damaging the polycondensate product, particularly by discoloration.

Still another object of the invention is to provide a continuous four-stage process for production of a polyester condensate from dimethyl terephthalate and ethylene glycol wherein the temperatures employed in each stage are carefully regulated within minimum ranges adapted to avoid damage or degradation of the polycondensate product.

Yet another object of the invention is to reduce the amount of excess ethylene glycol required to be added for transesterification of dimethyl terephthalate during the continuous process.

These and other important objects and advantages of the invention will become readily apparent upon a consideration of the following detailed description taken in conjunction with the accompanying drawings wherein:

Fig. 1 illustrates, in partially schematic form, a specific apparatus which is particularly suitable for carrying out the continuous process of the invention; and Fig. 2 is a diagrammatic flow sheet which more generally illustrates the continuous process.

In accordance with the invention, it has now been found that the condensation reaction of dimethyl terephthalate with ethylene glycol, i.e., the transesterification of dimethyl terephthalate and its subsequent polycondensation to form polyethylene terephthalate, can be carried out with surprisingly effective results in a four-stage continuous process by liquefying dimethyl terephthalate and mixing ethylene glycol therewith to form a liquid reaction mixture in a first stage at temperatures below that at which transesterification occurs, conducting the liquid reaction mixture in continuous liquid flow through three succeeding stages during which transesterification and polycondensation takes place with the liberation of methanol and ethylene glycol as vaporous reaction products, and recovering the ethylene glycol for recycle to the second stage of the process.

In particular, a liquid reaction mixture is prepared in the first stage for a continuous processing by suitably preheating dimethyl terephthalate to which ethylene glycol has been added to obtain an intimate mixture of the liquid reactants. This preheating in the first stage is carried out at a minimum temperature sufficient to melt or liquefy the dimethyl terephthalate, preferably at a temperature below about 150° C., i.e., at a temperature below that at which transesterification will occur to any appreciable extent. A suitable transesterification catalyst can also be added in this first stage so as to be intimately mixed with the reactant materials. Generally, it is desirable to initiate the reaction by adding a large excess of ethylene glycol and then gradually reducing the amount in excess until equilibrium conditions have been reached in the continuous process. However, it is possible after equilibrium is obtained to add a much smaller proportion of ethylene glycol, e.g., a molar ratio of ethylene glycol to dimethyl terephthalate of less than about 1.5:1, and preferably of from 1.4:1 to 1.3:1.

Any of the well known transesterification catalysts can be suitably employed in the continuous process of the invention. The catalyst, usually in a finely divided form, is preferably added in the first stage of the process but can also be advantageously added in the second stage of the process in order to more completely avoid the occurrence of a transesterification reaction in the first stage. Zinc acetate has been found to be particularly useful as a transesterification catalyst for this process. Other suitable catalysts include, for example, cobalt acetate, manganic acetate, calcium acetate, lithium acetate, antimony trioxide.

The liquid reaction mixture from the first stage is fed continuously through three separate and distinct successive reaction stages. The second and third reaction stages are very effectively carried out in a U-shaped reaction vessel, either branch of which is heated to a different temperature relative to the boiling point of ethylene glycol, i.e., 197.4° C.

In the second stage, the liquid reaction mixture is subjected to a transesterification temperature of not more than 197° C., and preferably from about 185° C. to 195° C., whereby an interchange of esters takes place between the dimethyl terephthalate and ethylene glycol with the liberation of methanol. An inert gas, such as nitrogen, is preferably passed through the reaction mixture in order to more effectively remove methanol as a vaporous reaction product, any excess of ethylene glycol remaining in its liquid form.

In the third stage, the liquid reaction mixture is heated to a temperature of from 197° C. to not more than 230° C., preferably from about 200° C. to 220° C., while removing vaporous reaction products by passing an inert gas such as nitrogen through the liquid mixture. The vaporous reaction products consist essentially of methanol with smaller quantities of ethylene glycol. Although some additional transesterification occurs in this third stage together with perhaps a small degree of polycondensation of the ethylene glycol ester of terephthalic acid, the principal function of this stage of the process is to obtain a maximum removal of vaporous reaction products, particularly methanol, prior to a succeeding polycondensation in the fourth stage of the reaction. Generally speaking, the temperature range employed in this stage is somewhat higher than that ordinarily employed for transesterification and, similarly, falls below that which is usually desirable for an effective polycondensation. In any event, this third reaction stage is believed to be an essential step in providing a successful and effective continuous process.

In the fourth stage, the liquid reaction mixture is subjected to a polycondensation temperature of from 230° C. to 270° C., preferably from about 250° C. to 255° C., while removing vaporous reaction products consisting predominantly of ethylene glycol split off during the polycondensation reaction. As in the previous stages, this removal of vaporous reaction products is best accomplished by passing an inert gas through the liquid reaction mixture, and in this case the inert gas is preferably conducted countercurrent to the flow of reaction material.

Ethylene glycol is recovered from the vaporous reaction products by a suitable condensation and separation from methanol and the inert gas and is preferably continuously recycled to the second stage of the reaction. If desired, it is also possible to recycle the ethylene glycol to the first stage so as to be mixed with the liquid dimethyl terephthalate and thereafter conducted to the second stage. The continuous return of ethylene glycol to the second stage of the process is particularly effective in reducing the amount of excess glycol which must be added with reference to the continuous supply of dimethyl terephthalate. Thus, the molar ratio of ethylene glycol to dimethyl terephthalate can be successfully reduced to about 1.35:1.

The continuous process of the invention is particularly advantageous in reducing the total time required to complete the reaction. Thus, in a batch or discontinuous process, relatively high temperatures are employed in order to reduce as far as possible the time required for the reaction. However, it has been found that a greater degradation and discoloration of the product occurs with increasing temperatures, but at the same time an attempt to employ lower temperatures will result in an extended reaction time which unduly limits the effectiveness of the process. In contrast, the present invention contemplates a substantial reduction in both the temperatures employed and the time required for reaction, thereby providing a much improved process for commercial purposes.

Thus, with the temperature ranges carefully controlled within the above specified ranges in each of the four stages of the continuous process, it is possible to provide a maximum residence time of not more than 10 hours.

The term "maximum residence time" is employed herein to mean the average length of time required for a small increment of material to pass through the entire continuous reaction and is the amount of time required such that the polyester product is polymerized sufficiently to provide material which can be satisfactorily extruded and drawn into a filament or fiber. Of course, even shorter residence times can be employed to obtain a product which is not completely polymerized.

In some instances, it may be desirable to further heat the polycondensate product after removal from the fourth stage according to familiar processes, either in the molten state or in solvents, for an additional short period of time to obtain a polyester which can be satisfactorily spun into filaments.

Referring now to the drawings, Fig. 1 illustrates a particularly effective apparatus which is quite simple in its construction but which is exceptionally well adapted to the requirements of the continuous four-stage process of the invention. It will be understood, of course, that other suitable apparatus may also be employed as will be readily recognized by those skilled in the art, particularly with reference to Fig. 2 which more generally illustrates the process in the form of a diagrammatic flow sheet. In each of the figures, the encircled numerals 1, 2, 3 and 4 represent the corresponding stages in the four-stage process.

In Fig. 1, a melting or liquefying vessel 5 is employed as the first stage of the process for heating the reaction components, i.e., dimethyl terephthalate and ethylene glycol, to obtain a liquid reaction mixture. The liquid reaction mixture is continuously conducted from vessel 5, by means of control valve 6, into a U-shaped reaction vessel which consists of two reaction tubes, a right branch 7 and a left branch 8, corresponding to the second and third stages of the process, respectively. The liquid reaction mixture flows by gravity through each of the reaction stages.

In the second stage, the reaction tube 7 is heated to a maximum temperature of 197° C., i.e., the boiling point of ethylene glycol while the third stage reaction tube 8 is heated to a temperature of from 197° C. to a maximum of 230° C. These temperatures are constantly maintained throughout the continuous reaction.

Methanol vapours together with small portions of ethylene glycol are drawn off through line 9, and the ethylene glycol condensed by means of any suitable heat exchanger or other cooling apparatus (not shown) and returned or conducted back into reaction tube 7. The methanol is recovered and separated by condensing in any suitable manner.

The reaction mixture rises in reaction tube 8 and passes through a connecting line or bridge 10 into the reaction vessel 11 which is constructed as a thin-layer evaporator and corresponds to the fourth stage of the process. The reaction vessel 11 is heated at from about 230° C. to 270° C., preferably within a specific range of from 250° C. to 255° C. for polycondensation of the reaction mixture. The polyester condensate product is withdrawn at 12 at about the same rate as the reactant materials are introduced into the first stage.

Ethylene glycol, liberated in the third and fourth reaction stages, corresponding to tube 8 and vessel 11, is passed continuously by means of conduit 13 back into the second reaction stage, tube 7. Sufficient cooling may be obtained in conduit 13 to condense a large proportion of the ethylene glycol vapors so that only a small amount will pass by the reaction mixture introduced from vessel 5 and be carried together with the methanol vapors through line 9. The molar ratio of ethylene glycol to dimethyl terephthalate is advantageously reduced by the recycle of ethylene glycol in the manner described. The amount of glycol present between reaction stages 2 and 3 can be easily checked by taking samples through valve 14 at the bottom of the U-shaped reactor.

The heating of each of the reaction stages is accomplished by any suitable means. For example, a fluid heat medium such as a high boiling point organic liquid can be passed through a heating jacket surrounding each reaction stage. Thus, in Fig. 1, a typical organic liquid such as diphenyl can be employed to heat vessel 5 by means of heating jacket 15 having inlet 15a and outlet 15b, to heat tube 7 by means of heating jacket 16 having inlet 16a and outlet 16b, to heat tube 8, by means of heating jacket 17 having inlet 17a and outlet 17b, and to heat vessel 11 by means of heating jacket 18 having inlet 18a and outlet 18b. It will be noted that the heating jacket 17 also surrounds the heating jacket 18 to prevent heat loss and thereby provide a more efficient heat transfer in the fourth stage reaction vessel 11.

In Fig. 2, suitable electrical heating elements are indicated diagrammatically in each of the four reaction stages.

During the reaction, an inert gas such as nitrogen is introduced near the bottom of each of the second, third, and fourth reaction stages as indicated in Fig. 1 at 19, 20, and 21, respectively, and is conducted either in parallel or countercurrent flow through the liquid reaction mixture as indicated by the arrows. The inert gas advantageously serves in purging the reaction mixture of vaporous reaction products for subsequent recycle or recovery.

In Fig. 2, which illustrates a simplified flow sheet of the continuous reaction, the reactant materials are supplied continuously to the first stage melting zone 22 and the liquid reaction mixture formed therein is conducted through line 23 to the second stage reactor 24 for transesterification. An inert gas is introduced through line 25 at the bottom of reactor 24 and vaporous reaction products are removed through line 26. The liquid reaction mixture is then conducted through line 27 to the third stage reactor 28 while an inert gas is introduced through line 29. The vaporous reaction products leave reactor 28 through line 30 and the liquid reaction mixture proceeds through line 31 to the fourth stage reactor 32 for polycondensation and distillation of ethylene glycol which is split off in this stage of the reaction. An inert gas is introduced through line 33 for countercurrent flow with the reaction mixture in reactor 32 in order to remove the ethylene glycol through line 34 joined with the vaporous reaction products from lines 26 and 30. The vaporous reaction products are passed through condenser 35 to condense ethylene glycol which is returned to the second stage through line 36, methanol and the inert gas passing off from the condenser through line 37 for subsequent separation and recovery.

The invention is further illustrated but not limited by the following example in which the process is carried out in an apparatus corresponding to that shown in Fig. 1.

*Example*

In order to start up or initiate the continuous reaction, the various reaction stages must first be filled with the liquid reaction mixture and the reaction carried out in a manner adapted to reach the set of equilibrium conditions desired for continuous operation. Thus, a procedure is followed in starting the reaction such that the molar ratio of ethylene glycol to dimethyl glycol is about 2:1, but after ethylene glycol begins to be returned from the third and fourth stages of the reaction to the second stage, the molar ratio of ethylene glycol to dimethyl terephthalate is reduced gradually to about 1.35:1 at which value equilibrium is established according to the specific temperatures and throughput of this example.

After equilibrium is reached, ethylene glycol and dimethyl terephthalate in a molar ratio of about 1.35:1 are added to the first stage and mixed together with about 0.05% by weight of zinc acetate as a catalyst. The melting vessel 5 of the first stage has a capacity of about 500 ml. while the U-shaped reaction tube, including tube 7 and tube 8, has an inside diameter of 30 mm. and an effective capacity of 850 ml. The thin-layer evaporator has an effective capacity of about 2000 ml. The total volume of liquid reaction material which is contained at any time in all four stages, including the connecting lines or bridges is about 3500 ml. The polyester condensate product is withdrawn from the fourth stage of the reaction at a rate approximately equal to that at which reactant materials are added to the first stage to obtain a continuous throughput of about 190 to 200 grams/hour of the liquid reaction mixture.

The mixture in the first stage is warmed to about 145° C. and the resulting liquid mass conducted by means of control valve 6 into the second and third reaction stages of the U-shaped tube, the right and left branches of the tube, 7 and 8, being maintained at temperatures of 190° C. and 210° C., respectively. The liquid reaction mixture then passes over bridge 10 into the thin-layer evaporator 11 which is heated to about 250° C. Ethylene glycol, which is liberated in the third and fourth stages and purged by means of nitrogen passed upwardly through the liquid reaction mixture, flows back into the second reaction stage or tube 7. Methanol, which has been liberated as a vaporous reaction product, is conducted together with nitrogen and small quantities of ethylene glycol through line 9 and passed through condensing means in order to separate and recover the vapors, ethylene glycol being returned to tube 7.

The maximum residence time of material contained in the reaction system is about 10 hours. The resulting polyethylene terephthalate is sufficiently polymerized to provide a valuable product for the production of synthetic filaments or fibers and is produced with a high degree of uniform quality.

The invention is hereby claimed as follows:

1. A continuous four-stage process for production of a polyethylene terephthalate condensate from dimethyl terephthalate and ethylene glycol by transesterification and polycondensation which comprises: liquefying dimethyl terephalate and mixing excess ethylene glycol therewith in a molar ratio of said ethylene glycol to said dimethyl terephthalate of less than about 1.5:1 to form a liquid reaction mixture in a first stage at a temperature below that at which transesterification occurs; conducting said liquid reaction mixture in continuous liquid flow from said first stage through three succeeding stages which are spatially separated for separate temperature control and which are in liquid communication to form a continuous liquid phase reaction system, such that the liquid reaction mixture is (a) transesterified in the second stage at a temperature of not more than 197° C. in the presence of a transesterification catalyst, (b) heated in the third stage to a temperature of from 197° C. to not more than 230° C. while removing vaporous reaction products directly from the third stage by passing an inert gas through the liquid reaction mixture in said third stage separately from the other stages, and (c) polycondensed in the fourth stage at a temperature of from 230° C. to 270° C. for a period of time sufficient to produce a filament-forming polyethylene terephthalate condensate while removing vaporous reaction products from the fourth stage by passing an inert gas through the liquid reaction mixture; and recovering said polyethylene terephthalate condensate product from said fourth stage at a rate approximately equal to the rate at which reactant materials are added to the first stage.

2. A continuous four-stage process for production of a polyethylene terephthalate condensate from dimethyl terephthalate and ethylene glycol by transesterification and polycondensation which comprises: liquefying dimethyl terephthalate and mixing excess ethylene glycol therewith in a molar ratio of said ethylene glycol to said dimethyl terephthalate of less than about 1.5:1 to form a liquid reaction mixture in a first stage at a temperature below about 150° C.; conducting said liquid reaction mixture in continuous liquid flow from said first stage through three succeeding stages which are spatially separated for separate temperature control and which are in liquid communication to form a continuous liquid phase reaction system, such that the liquid reaction mixture is (a) transesterified in the second stage at a temperature of from 185° C. to 195° C. in the presence of a transesterification catalyst, (b) heated in the third stage to a temperature of from 200° C. to 220° C. while removing vaporous reaction products directly from the third stage by passing an inert gas through the liquid reaction mixture in said third stage separately from the other stages, and (c) polycondensed in the fourth stage at a temperature of from 250° C. to 255° C. for a period of time sufficient to produce a filament-forming polyethylene terephthalate condensate while removing vaporous reaction products from the fourth stage by passing an inert gas through the liquid reaction mixture; and recovering said polyethylene terephthalate condensate product from said fourth stage at a rate approximately equal to the rate at which reactant materials are added to the first stage.

3. A continuous process as claimed in claim 1 wherein the transesterification catalyst is zinc acetate.

4. A continuous process as claimed in claim 1 wherein ethylene glycol is recovered from at least the fourth stage and recycled to the second stage of the reaction system.

5. A continuous process as claimed in claim 1 wherein the molar ratio of ethylene glycol to dimethyl terephthalate added in the first stage is from 1.4:1 to 1.3:1.

6. A continuous four-stage process for production of a polyethylene terephthalate condensate from dimethyl terephthalate and ethylene glycol by transesterification and polycondensation which comprises: liquefying dimethyl terephthalate and mixing excess ethylene glycol therewith in a molar ratio of said ethylene glycol to said dimethyl terephthalate of from 1.4:1 to 1.3:1 to form a liquid reaction mixture in a first stage at a temperature below about 150° C.; conducting said liquid reaction mixture in continuous liquid flow from said first stage through three succeeding stages which are spatially separated for separate temperature control and which are in liquid communication to form a continuous liquid phase reaction system, such that the liquid reaction mixture is (a) transesterified in the second stage at a temperature of from 185° C. to 195° C. in the presence of a transesterification catalyst, (b) heated in the third stage to a temperature of from 200° C. to 220° C. while removing vaporous reaction products consisting essentially of methanol and ethylene glycol directly from the third stage by passing nitrogen through the liquid reaction mixture in said third stage separately from the other stages, and (c) polycondensed in the fourth stage at a temperature of from 250° C. to 255° C. for a period of time sufficient to produce a filament-forming polyethylene terephthalate condensate while removing vaporous reaction products consisting predominately of ethylene glycol from the fourth stage by passing nitrogen through the liquid reaction mixture; withdrawing said polyethylene terephthalate condensate product from said fourth stage at a rate approximately equal to the rate at which reactant materials are added to the first stage; and recycling ethylene glycol from at least the fourth reaction stage to the second stage of the reaction system.

References Cited in the file of this patent

UNITED STATES PATENTS

| | | |
|---|---|---|
| 2,465,319 | Whinfield | Mar. 22, 1949 |
| 2,681,360 | Vodonik | June 15, 1951 |